(12) United States Patent
Urata et al.

(10) Patent No.: US 11,340,468 B2
(45) Date of Patent: May 24, 2022

(54) INTEGRATED OPTICAL CIRCULATOR ENABLING POLARIZATION DIVERSITY

(71) Applicant: Google LLC, Mountain View, CA (US)

(72) Inventors: Ryohei Urata, San Carlos, CA (US); Lieven Verslegers, San Mateo, CA (US); Hong Liu, Palo Alto, CA (US); Daoyi Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/985,301

(22) Filed: Aug. 5, 2020

(65) Prior Publication Data

US 2020/0363646 A1    Nov. 19, 2020

Related U.S. Application Data

(63) Continuation of application No. 15/975,268, filed on May 9, 2018, now Pat. No. 10,775,637.

(60) Provisional application No. 62/595,539, filed on Dec. 6, 2017.

(51) Int. Cl.
| | |
|---|---|
| *G02B 27/28* | (2006.01) |
| *G02B 27/09* | (2006.01) |
| *G02B 6/126* | (2006.01) |
| *G02B 6/10* | (2006.01) |
| *G02B 6/27* | (2006.01) |
| *G02F 1/09* | (2006.01) |

(Continued)

(52) U.S. Cl.
CPC ......... *G02B 27/283* (2013.01); *G02B 5/3083* (2013.01); *G02B 6/105* (2013.01); *G02B 6/126* (2013.01); *G02B 6/272* (2013.01); *G02B 6/2773* (2013.01); *G02B 27/0977* (2013.01); *G02F 1/093* (2013.01); *G02B 6/27* (2013.01); *G02B 6/4213* (2013.01); *G02B 6/4246* (2013.01)

(58) Field of Classification Search
CPC ...... G02B 5/3083; G02B 27/283; G02F 1/093
USPC .......................... 359/484.05, 489.07, 489.08
See application file for complete search history.

(56) References Cited

U.S. PATENT DOCUMENTS

| | | | |
|---|---|---|---|
| 4,272,159 A | 6/1981 | Matsumoto | |
| 4,650,289 A | 3/1987 | Kuwahara | |
| 5,204,771 A | 4/1993 | Koga | |

(Continued)

FOREIGN PATENT DOCUMENTS

| | | | |
|---|---|---|---|
| CN | 1438505 A | 8/2003 | |
| CN | 102221728 A | 10/2011 | |

(Continued)

OTHER PUBLICATIONS

Notification of the First Office Action for Chinese Patent Application No. 201880033560.3 dated Oct. 12, 2020. 12 pages.

(Continued)

*Primary Examiner* — Ricky D Shafer
(74) *Attorney, Agent, or Firm* — Lerner, David, Littenberg, Krumholz & Mentlik, LLP (57) ABSTRACT

A photonic integrated circulator can be fabricated by including a plurality of polarizing beam splitters and optical polarization rotators such that two copies of the optical signal are output at a receiver in substantially aligned polarization states. The circulator can be used for facilitating bi-directional communications between photonic integrated circuit devices, which are inherently polarization sensitive, while reducing signal loss.

42 Claims, 4 Drawing Sheets

(51) Int. Cl.
  *G02B 5/30*   (2006.01)
  *G02B 6/42*   (2006.01)

(56)       References Cited

U.S. PATENT DOCUMENTS

| | | |
|---|---|---|
| 5,381,250 A | 1/1995 | Meadows |
| 5,982,539 A | 11/1999 | Shirasaki |
| 5,999,313 A | 12/1999 | Fukushima |
| 6,487,014 B2 | 11/2002 | Li |
| 6,535,324 B1 | 3/2003 | Hwang et al. |
| 6,760,160 B2 | 7/2004 | Zhang et al. |
| 9,897,758 B2 * | 2/2018 | Du ................. G02B 6/4213 |
| 9,989,700 B1 * | 6/2018 | Ayliffe ............ G02B 6/4213 |
| 10,775,637 B2 * | 9/2020 | Urata ............... G02B 6/105 |
| 2003/0151812 A1 | 8/2003 | Shao |
| 2004/0086214 A1 * | 5/2004 | Huang ............. G02B 6/2746 |
| | | 385/11 |
| 2005/0018967 A1 * | 1/2005 | Huang ............... G02F 1/093 |
| | | 385/39 |
| 2016/0047987 A1 | 2/2016 | Du et al. |

FOREIGN PATENT DOCUMENTS

| | | |
|---|---|---|
| CN | 205229520 U | 5/2016 |
| CN | 206649185 U | 11/2017 |
| JP | 2002244080 A | 8/2002 |

OTHER PUBLICATIONS

Office Action for European Patent Application No. 18826156.4 dated Dec. 12, 2021. 6 pages.

* cited by examiner

INTEGRATED OPTICAL CIRCULATOR ENABLING POLARIZATION DIVERSITY

CROSS REFERENCE TO RELATED APPLICATIONS

This application is a continuation of U.S. patent application Ser. No. 15/975,268, filed May 9, 2018, which claims the benefit of, and priority to, U.S. Provisional Application No. 62/595,539, titled "Integrated Optical Circulator Enabling Polarization Diversity", and filed on Dec. 6, 2017, the entire contents of which are hereby incorporated by reference for all purposes.

BACKGROUND

Today's optical communication networks require the management of a large number of optical fiber interconnections. In many of these interconnections, the transmitted and received signals are run in two separate fibers. Bi-directional communication, where the upstream and downstream signals are running inside a single fiber, is an effective way to reduce the number of fibers used in a fiber-optic communication network. The key for implementing such bi-directional communications is to effectively separate and combine the upstream and downstream signals. One approach to separating and combining upstream and downstream signals is to add optical circulators to each end of a fiber.

SUMMARY

At least one aspect is directed to an integrated optical circulator enabling polarization diversity. The integrated optical circulator includes a first port configured to receive a first optical signal. The integrated optical circulator includes a second port configured to transmit the first optical signal received at the first port and also configured to receive a second optical signal. The integrated optical circulator includes a first polarizing beam splitter configured to receive the second optical signal, split the second optical signal into a first optical signal component and a second optical signal component, direct the first optical signal component towards a first reflective surface wherein the first reflective surface is configured to further direct the first optical signal component to pass through a first optical polarization rotator, and direct the second optical signal component through a second optical polarization rotator. The integrated optical circulator includes a second polarizing beam splitter configured to receive the second optical signal component after the second optical signal component passes through the second optical polarization rotator, and direct the second optical signal component towards a second reflective surface. The second reflective surface directs the second optical signal component towards a third optical polarization rotator. The integrated optical circulator includes a third configured to transmit the first optical signal component of the second optical signal after it passes through the first optical polarization rotator, the third port transmitting the first component at a first polarization state. The integrated optical circulator includes a fourth port configured to receive the second component of the second optical signal after it passes through the third optical polarization rotator, the fourth port transmitting the second optical signal component at a second polarization state substantially aligned with the first polarization state.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Today's optical communication networks require the management of a large number of optical fiber interconnections. In many of these interconnections, the transmitted and received signals are run in two separate fibers. Employing bi-directional communication, where the transmitted and received signals are running inside a single fiber, can reduce the number of fibers used in a fiber-optic communication network. The key for implementing such bi-directional communications is to effectively separate and combine the upstream and downstream signals at each end of the fibers.

One approach to establishing bi-directional communications is to add optical circulators to each end of a fiber. Optical circulators are typically three port devices which have a cyclic connectivity. For instance, an input optical signal enters port 1 of the circulator and is directed to port 2, while another input optical signal enters port 2 and is directed to port 3. To achieve this functionality, the circulator is equipped with a combination of polarizers, non-reciprocal/magneto-optical materials such as Garnet, and phase retarders.

Figure 1:
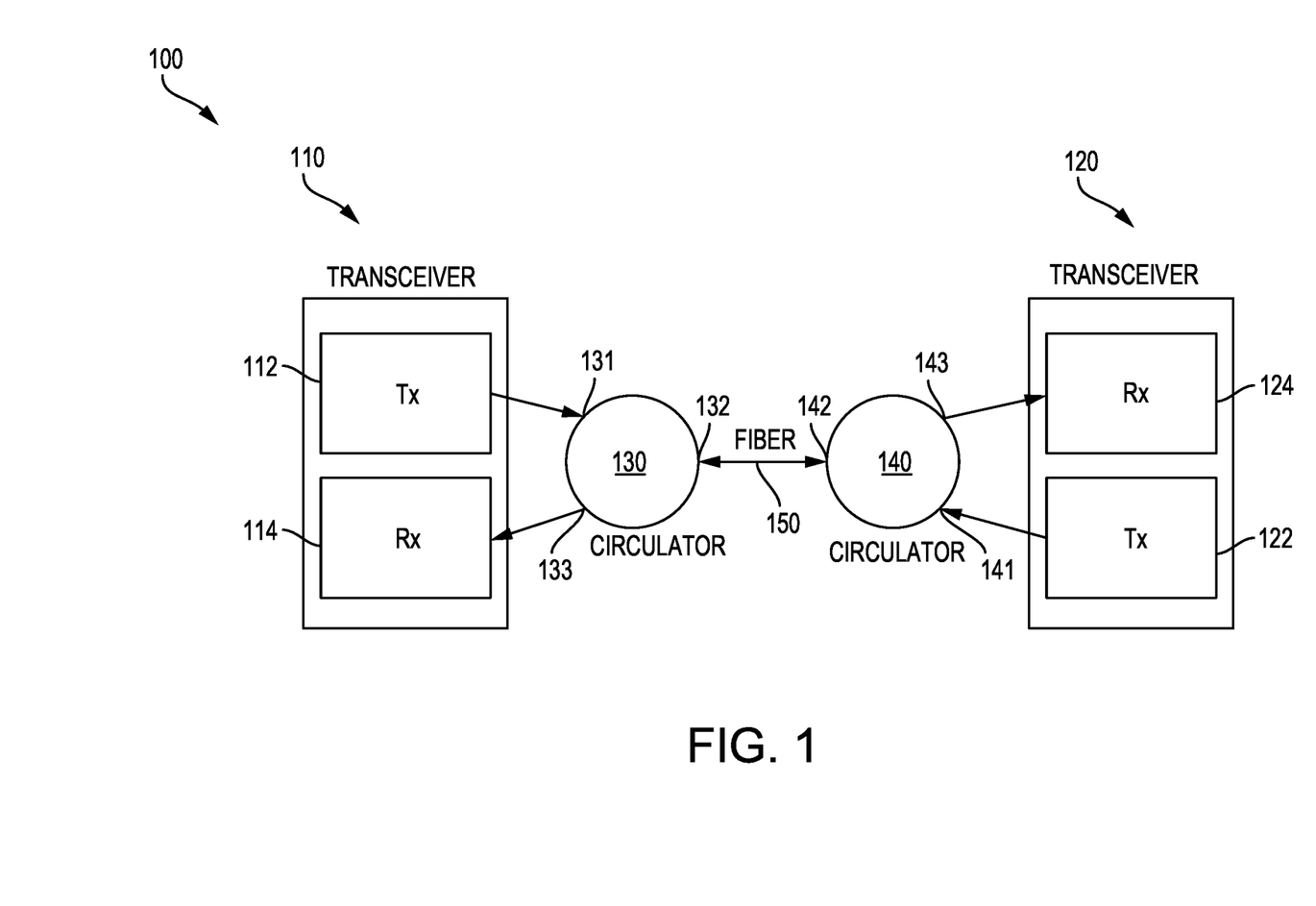
FIG. 1 shows a schematic of an example of a bi-directional communication system implemented with circulators, according to an illustrative implementation.

FIG. 1 illustrates a bi-directional communication system 100 implemented with optical circulators. The Bi-directional communication system 100 includes a first transceiver 110, a second transceiver 120, a first circulator 130, a second circulator 140, and an optical fiber 150. The first transceiver 110 includes a first transmitter 112 and a first receiver 114. Similarly, the second transceiver 120 includes a second transmitter 122 and a second receiver 124. The first circulator 130 includes a first port 131, a second port 132 and a third port 133. Circulator 140 includes a fourth port 141, a fifth port 142 and a sixth port 143. The first port 131 is optically coupled to the first transmitter 112, while the third port 133 is optically coupled to the first receiver 114. Similarly, the fourth port 141 is optically coupled to the second transmitter 122, while the sixth port 143 is optically coupled to the second receiver 124. The second port 132 and the fifth port 142 are connected by an optical fiber 150.

The first transmitter 112 transmits an optical signal that enters the first port 131. The first circulator 130 directs the optical signal entering the first port 131 to exit the second port 132. The optical signal then propagates through the optical fiber 150 and enters the fifth port 142 of the second circulator 140. Once the optical signal enters the fifth port 142, the second circulator 140 directs the optical signal to exit the sixth port 143, where the second receiver 124 receives the signal. Similarly, the second transmitter 122 transmits an optical signal to the fourth port 141 of the second circulator 140. The second circulator 140 directs the optical signal entering the fourth port 141 to exit the fifth port 142. The optical signal then propagates through the optical fiber 150 and enters the second port 132 of the first circulator 130. Once the optical signal enters the second port 132, the first circulator 130 directs the optical signal to exit the third port 133, where the first receiver 114 receives the signal. As shown in this example, attaching the circulators at each end of the fiber eliminates the need to use two fibers to connect the transmitters and receivers of the two transmitters. In addition to reducing the number of optical fibers needed for optical communication networks, optical circulators can improve the efficiency of networks employing optical circuit switching technologies.

One disadvantage of adding traditional circulators to a fiber optic network is that realization of their advantages requires adding circulators external to the optical transceivers, which can increase cost, size, and insertion loss of the fiber optic link. However, integrated silicon photonics is a developing technology in the field of optical communications which promises low power and low cost photonic integrated circuits by leveraging low cost, high yielding silicon complementary metal-oxide-semiconductor (CMOS) integrated circuit foundries to fabricate integrated photonics in silicon, where the various transmitter and receiver devices of the transceiver would be combined in a single chip. These photonic integrated circuits form the engine of the optical transceiver. Thus, it may be preferable to configure a circulator so that it can be integrated with the photonic integrated circuit in order to eliminate the need to add circulators external to the optical transceiver.

Integrated components have great potential to reduce the cost and size of fiber optic networks. However, many critical devices utilized in silicon photonics, such as waveguide based devices, are sensitive to polarization states. This means that the characteristics of the device vary based on the polarization of the light being used within the device. For example, many types of Mach-Zehnder based Rx demultiplexer (demux) devices are polarization sensitive because the effective index of the waveguide is dependent on the polarization. Consequently, the integrated devices work more efficiently when receiving optical signals propagating in one polarized state than when they receive optical signals in another polarized state. In the case of silicon photonics, devices work more efficiently when receiving optical signals propagating in a p-polarized state as opposed to s-polarized signals. Thus, it is difficult to design integrated devices to be polarization diverse in most standard CMOS processes. Although silicon photonic IC transmitters can be configured to transmit an optical signal in a specific polarized state, the optical signal typically does not reach a corresponding receiver in the same polarized state. This is because the optical signal can become depolarized as it propagates through a fiber due to the inherent properties of the fiber.

Traditional circulators utilize birefringent materials to separate the orthogonal polarizations of an incoming optical signal. However, as the optical signal propagates through the circulator, the orthogonal polarizations are recombined by further birefringent materials. Thus, the optical signal carries mixed polarizations as it exits the circulator and is received by the transceiver. But, as discussed above, the integrated silicon devices may not work efficiently with the s-polarized component of the optical signal, and an unfavorable amount of optical signal loss will occur. Consequently, it is unfavorable to integrate traditional circulators with silicon photonic ICs. Accordingly, it is advantageous to design a device that would enable bi-directional communications between photonics IC-based transceivers, while addressing the polarization sensitivity of the silicon based devices.

One way for achieving bi-directional communication with silicon photonic integrated devices, while addressing the polarization sensitivity of the silicon based devices, is to use a traditional external circulator with an integrated grating coupler in the silicon photonic IC. Certain grating couplers have been shown to separate orthogonal polarization modes. However, many grating couplers have a high fundamental optical loss. Also, as discussed earlier, the use of an external circulator can be undesirable due to added size, cost and optical loss associated with the circulator. Therefore, it may be preferable to construct an integrated device that allows the combination of bi-directional links with silicon photonic technologies for lower cost, high density optical interconnects. This disclosure proposes an integrated circulator configured to split the polarized states of an input signal into two component signals, and transmit the component signals to separate ports with their polarization states substantially aligned.

Devices according to this disclosure can address the issues associated with enabling bi-directional communications between photonic IC-based transceivers primarily in several ways. For example, in terms of size, the subject device is designed small enough such that it can be integrated with the photonic IC-based transceiver. Additionally, in order to reduce optical loss, the subject device's polarization splitting/combining components are configured in such a manner as to split the mixed polarization optical signal input into two separate optical signal components with orthogonal polarizations, and further rotating these separate optical signals to produce an output that accommodates the signal polarization requirements of the silicon photonics IC. To be sure, by separating the mixed polarization optical signal input into two signal components, and providing the signal components to an integrated transceiver in substantially the same polarization state, signal loss is reduced and both signal components are provided to the photonic chip in a polarized state that allow for effective demultiplexing and other functions being implemented in the chip.

Figure 2:
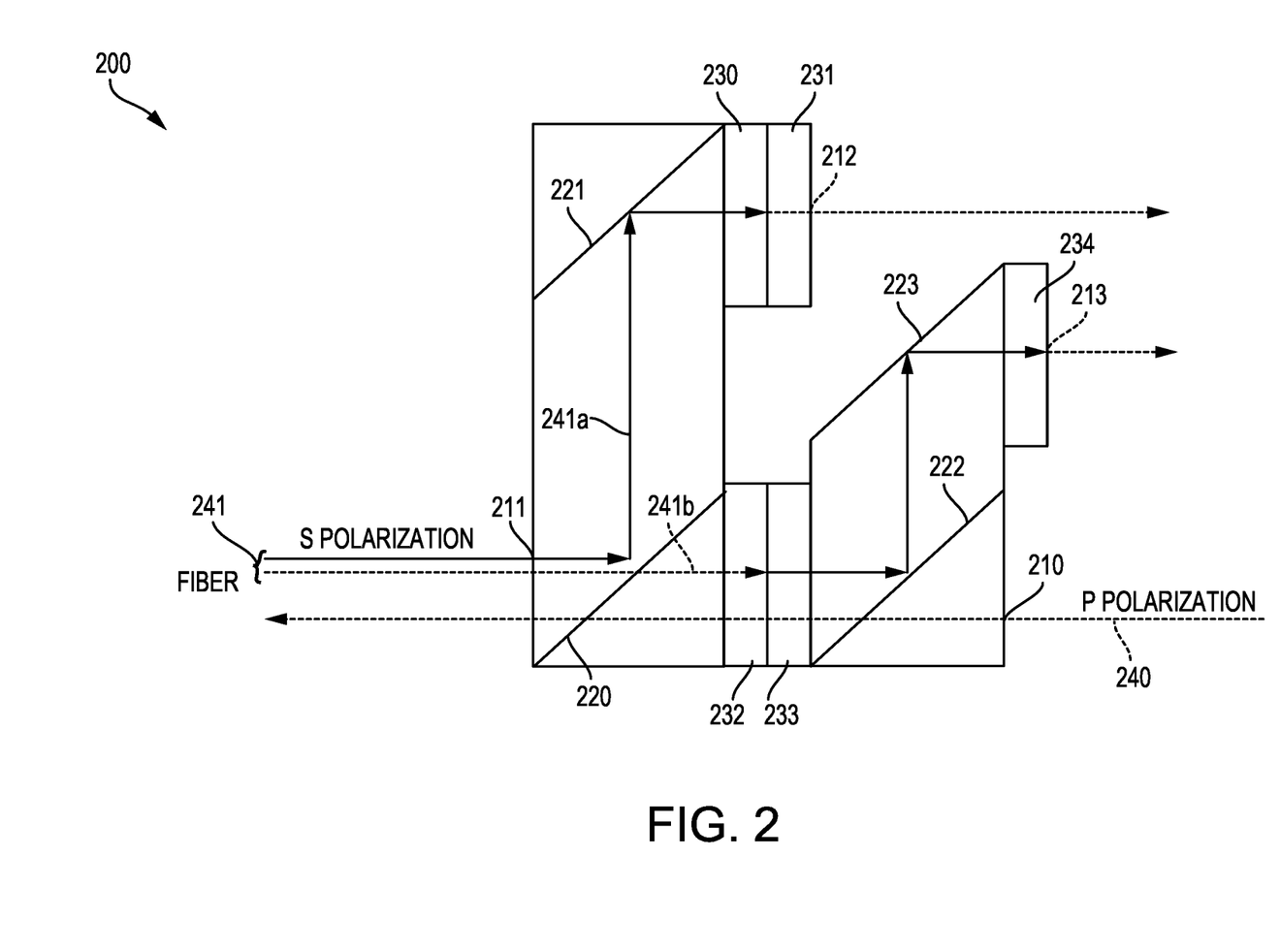
FIG. 2 shows a schematic of an example of an integrated optical circulator, according to an illustrative implementation.

FIG. 2 shows a schematic of an example of an integrated optical circulator 200, according to an illustrative implementation. The integrated optical circulator 200 can be used to implement bi-directional, polarization diverse optical links using silicon photonics. The integrated optical circulator 200 includes a first port 210, a second port 211, a third port 212, and a fourth port 213. The integrated optical circulator also includes a first polarizing beam splitter 220, a first reflective surface 221, a second polarizing beam splitter 222 and a second reflective surface 223. The first polarizing beam splitter 220 and the second polarizing beam splitter 222 may be polarizing beam splitters known in the art, such as polarizing cube beam splitters composed of a birefringent medium. In some embodiments, the first reflective surface 221 or the second reflective surface 223 are polarizing beam splitters. In other embodiments, both are polarization beam splitters. The integrated optical circulator also includes a first optical polarization rotator 230, a second optical polarization rotator 231, a third optical polarization rotator 232, a fourth optical polarization rotator 233 and a fifth optical polarization rotator 234.

The optical circulator 200 is a free space optical component. The second port 211 is positioned to receive a second optical signal 241. In some implementations, the second optical signal 241 includes a first optical signal component 241a and a second optical signal component 241b. The first polarization beam splitter 220 is optically coupled with the second port 211 and positioned to receive the second optical signal 241 after the second optical signal 241 propagates through the second port 211. The third optical polarization rotator 232 is optically coupled with the first polarizing beam splitter 220 and positioned to receive the second optical signal component 241b after it transmits through the first polarizing beam splitter 220. The fourth optical polarization rotator 233 is optically coupled with the third optical polarization rotator 232 and positioned to receive the second optical signal component 241b after it propagates through the third optical polarization rotator 232. The second polarizing beam splitter 222 is optically coupled with the fourth optical polarization rotator 233 and positioned to receive the second optical signal component 241b after it propagates through the fourth optical polarization rotator 233. The second reflective surface 223 is optically coupled to the second polarizing beam splitter 222 and positioned to receive the second optical signal component 241b after it is reflected by the second polarizing beam splitter 222. The fifth optical polarization rotator 234 is optically coupled with the second reflective surface 223 and positioned to receive the second optical signal component 241b after it propagates through the fifth optical polarization rotator 234. The first port 240 is optically coupled with the second polarizing beam splitter 222 and positioned to receive a first optical signal 240. The first reflective surface 221 is optically coupled with the first polarizing beam splitter 220 and positioned to receive the first optical signal component 221a after it is reflected by the first polarizing beam splitter 220. The first optical polarization rotator 230 is optically coupled with the first reflective surface 221 and positioned to receive the first optical signal component 241a after it is reflected by the first reflective surface 221. The second optical polarization rotator 231 is optically coupled with the first optical polarization rotator 230 and positioned to receive the first optical signal component 241a after it propagates through the first optical polarization rotator 230. The third port 212 is optically coupled with the second polarization rotator 231 and positioned to receive the first optical signal component 241a after it propagates through the second optical polarization rotator 231.

The first port 210 can receive the first optical signal 240 from a transmitter for coupling into the bi-directional optical link. The second port 211 can couple to a bi-directional optical link. The second port 211 can transmit the first optical signal 240 to the bi-directional optical link to which the second port 211 is coupled. The second port 211 can also receive the second optical signal 241 from the bi-directional optical link. The first polarizing beam splitter 220 can be configured to receive the second optical signal 241. The first polarizing beam splitter 220 can also be configured to split the second optical signal 241 into the first optical signal component 241a and the second optical signal component 241b. The second optical signal 241 has a mixed polarization when it is initially received at the second port 211 as denoted by the solid line and the dashed line. When the polarizing beam splitter 220 splits the second optical signal 241, it splits the signal into separate optical signal components with differing linear polarization. Ideally these separate optical signals are fully polarized after the split, with orthogonal polarizations.

The first polarizing beam splitter 220 can be further configured to direct the first optical signal component 241a towards the first reflective surface 221. The first reflective surface 221 can be configured to further direct the first optical signal component 241a to pass through a first optical polarization rotator 230 and a second optical polarization rotator 231. In some implementations, the first optical polarization rotator 230 can be a half-wave plate and the second optical polarization rotator 231 can be a Faraday rotator. The third port can be configured to transmit the first optical signal component 241a from the integrated optical circulator 200 after it passes through the second optical polarization rotator 231. The first optical signal component 241a, when transmitted from the third port 212, can have a first polarization state.

The first polarizing beam splitter 220 can also be configured to direct the second optical signal component 241b through the third optical polarization rotator 232 and the fourth optical polarization rotator 233. In some implementations, the third optical polarization rotator 232 can be a half-wave plate and the fourth optical polarization rotator 233 can be a Faraday rotator. The second polarizing beam splitter 222 can be coupled to the fourth optical polarization rotator 233 and configured to receive the second optical signal component 241b after the second optical signal component 241b passes through the fourth optical polarization rotator. The second polarizing beam splitter 222 can also be configured to direct the second optical signal component 241b towards the second reflective surface 223. The second reflective surface 223 can be configured to direct the second optical signal component 241b towards the fifth optical polarization rotator 234. The fourth port 213 can be configured to transmit the second optical signal component 241b after it passes through the fifth optical polarization rotator 234. The fourth port 213 can be coupled to a second receiver port and be configured to transmit the received second optical signal component 241b into the second receiver port. The second optical signal component 241b, when transmitted from the fourth port 213 can have a second polarization state substantially aligned with the first polarization state. Note that the second optical polarization rotator 231 and the fourth optical polarization rotator 233, which in this example are Faraday rotators, are optional and provide additional performance benefits if the corresponding receiver ports create high optical reflection. By ensuring both optical signal components are substantially aligned when they are transmitted at the third port 212 and the fourth port 213, the circulator can reduce signal loss.

The first optical signal 240 is p-polarized when it is received by the first port 210. This is because most semiconductor lasers are p-polarized. Consequently, the first optical signal 240 is fully polarized and can propagate through the various polarizing beam splitters and rotators to be received by the second port.

Another advantage of the present circulator is that it eliminates the need for an optical isolator. Most transceivers today utilize optical isolators, which are placed in front of or downstream from the transmitter in order to redirect reflection signals external to the transceiver away from the transmitted laser. This is because unwanted incoming external optical reflection signals can affect laser operation and stability. However, with the use of the present circulator, the silicon photonic chip's transmitter port Tx is isolated from optical signals, and thus there is no need for an optical isolator. Elimination of the isolator reduces optical loss and cost, and improves transceiver density.

Figure 3:
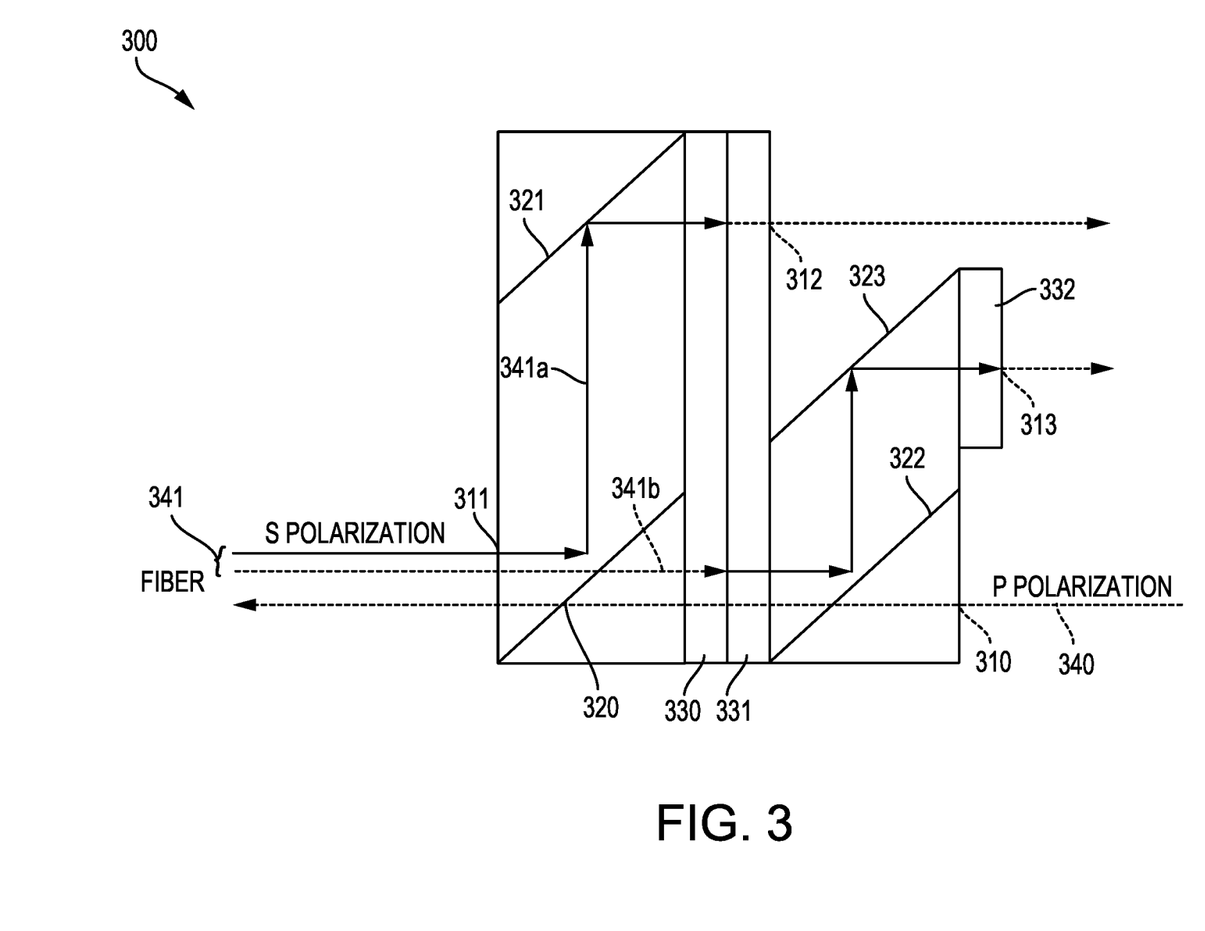
FIG. 3 shows a schematic of a further example of an integrated optical circulator, according to an illustrative implementation

The specific placements of the various circulator components are not limited to only the configuration shown in FIG. 2. For instance, FIG. 3 shows a schematic of an additional example of an integrated optical circulator 300 according to an illustrative implementation. The integrated optical circulator 300 can be used to implement bi-directional, polarization diverse optical links using silicon photonics. The integrated optical circulator 300 is similar to the integrated optical circulator 200 except that optical polarization rotators 230 and 232 are one contiguous optical polarization rotator, and optical polarization rotators 231 and 233 are also one contiguous optical polarization rotator. The integrated optical circulator 300 includes a first port 310, a second port 311, a third port 312, and a fourth port 313. The integrated optical circulator also includes a first polarizing beam splitter 320, a first reflective surface 321, a second polarizing beam splitter 322 and a second reflective surface 323. The integrated optical circulator also includes a first optical polarization rotator 330, a second optical polarization rotator 331, and a third optical polarization rotator 332.

The first port 310 can receive a first optical signal 340 from a transmitter for coupling into the bi-directional optical link. The second port 311 can couple to a bi-directional optical link. The second port 311 can transmit the first optical signal 340 to the bi-directional optical link to which the first port 311 is coupled. The second port 311 can also receive a second optical signal 341 from the bi-directional optical link. The first polarizing beam splitter 320 can be optically coupled to the second port 311. The first polarizing beam splitter 320 can be configured to receive the second optical signal 341. The first polarizing beam splitter 320 can also be configured to split the second optical signal 341 into a first optical signal component 341a and a second optical signal component 341b.

The first polarizing beam splitter 320 can be further configured to direct the first optical signal component 341a towards the first reflective surface 321, wherein the first reflective surface 321 is configured to further direct the first optical signal component 341a to pass through the first optical polarization rotator 330 and the second optical polarization rotator 331. In this example, the first optical polarization rotator 330 is a half-wave plate and the second optical polarization rotator 331 is a Faraday rotator. The third port 312 can be configured to transmit the first optical signal component 341a after it passed through the second optical polarization rotator 331. The third port can also be coupled to a first receiver port and be configured to transmit the received first optical signal component 341a into the first receiver port. The first optical signal component 341a, when transmitted from the third port 312, can have a first polarization state.

The first polarizing beam splitter 320 can further be configured to direct the second optical signal component 341b through the first optical polarization rotator 330 and the second optical polarization rotator 331. The second polarizing beam splitter 322 can be configured to receive the second optical signal component 341b after the second optical signal component 341b passes through the second optical polarization rotator 331. The second polarizing beam splitter 322 can also be configured to direct the second optical signal component 341b towards the second reflective surface 323. The second reflective surface 323 can be configured to direct the second optical signal component 341b towards the third optical polarization rotator 331. The fourth port 313 can be configured to transmit the second optical signal component 341b after it passes through the third optical polarization rotator 332. The fourth port 313 can also be coupled to a second receiver port and be configured to transmit the received second optical signal component 341b into the second receiver port. The second optical signal component 341b, when transmitted from the fourth port 313 can have a second polarization state substantially aligned with the first polarization state. Note that the second optical polarization rotator 331, which in this example is a Faraday rotator, is optional and provides additional performance benefits if the corresponding Rx1 and Rx2 ports create high optical reflection.

Notice that integrated optical circulator 300 is similar to integrated optical circulator 200 except that optical polarization rotator 230 and optical polarization rotator 232 are now one continuous optical polarization rotator 330. Additionally, optical polarization rotator 231 and optical polarization rotator 233 are now one continuous optical polarization rotator 331. This design allows for efficient manufacturing of the integrated optical circulator as all the components can now be easily stacked and divided into multiple integrated optical circulators.

Furthermore, the integrated optical circulator can be used in multi-channel devices, where multiple transmitters and receivers are integrated on a single silicon photonic chip. As the integrated optical circulator is a free space optical component, vertical displacement of the incoming and outgoing optical signals allow for the reuse and replication of the circulator's components and their function for multiple channels. Thus, a single integrated optical circulator can be used for two or more transmitter/receiver ports of a silicon photonic chip.

Figure 4:
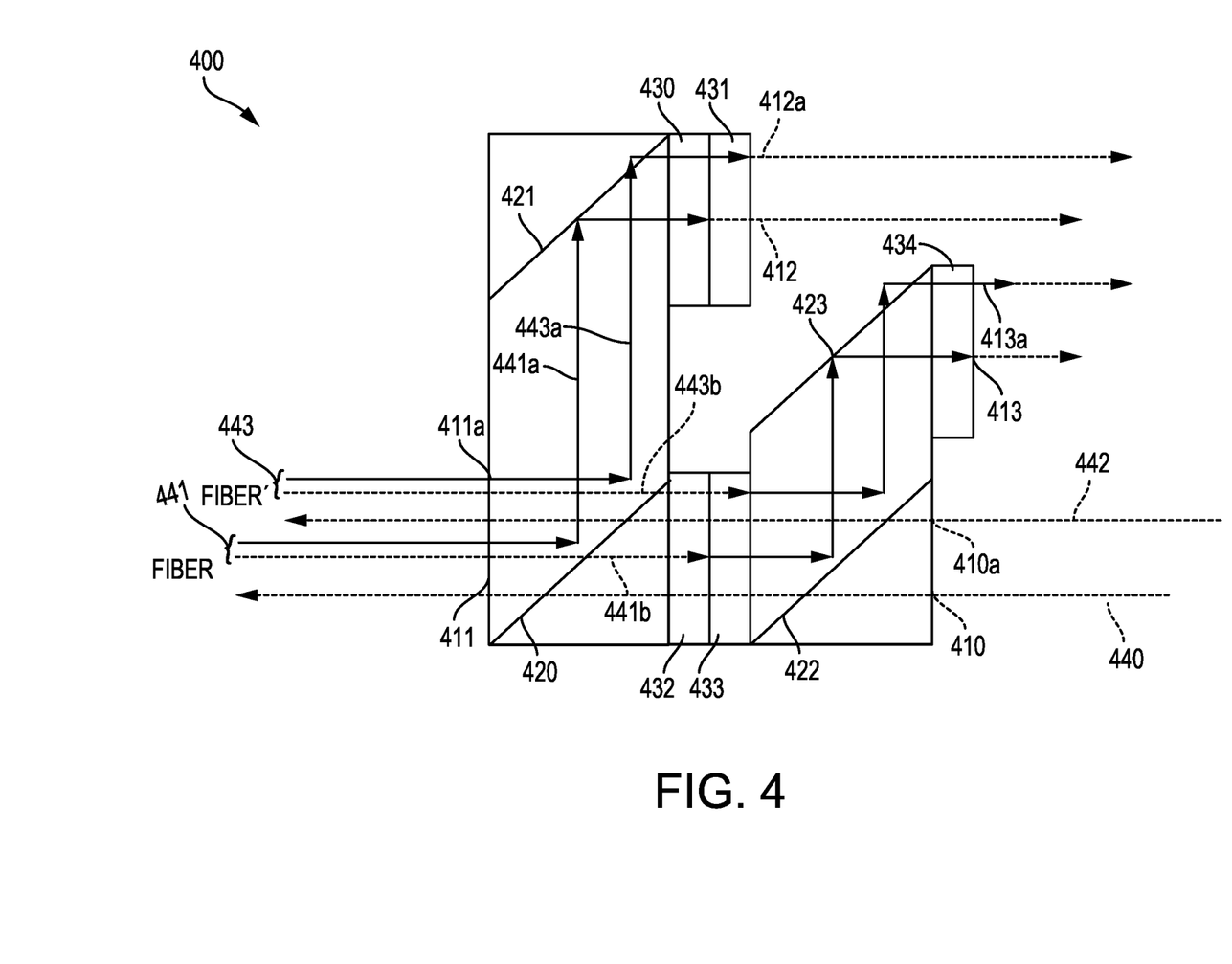
FIG. 4 shows a schematic of a further example of an integrated optical circulator configured for use with multiple transceivers, according to an illustrative implementation.

For instance, FIG. 4 shows a schematic of an additional example of an integrated optical circulator 400 according to an illustrative implementation. The integrated optical circulator 400 can be used to implement bi-directional, polarization diverse optical links using silicon photonics with multiple transceivers. The integrated optical circulator 400 is similar to the integrated optical circulator 200 except that integrated optical circulator 400 is configured to receive and separate additional optical signals. The integrated optical circulator 400 includes a first port 410, a second port 411, a third port 412, a fourth port 413, a fifth port 410a, a sixth port 411a, a seventh port 412a and an eighth port 413a. The integrated optical circulator also includes a first polarizing beam splitter 420, a first reflective surface 421, a second polarizing beam splitter 422 and a second reflective surface 423. The integrated optical circulator also includes a first optical polarization rotator 430, a second optical polarization rotator 431, a third optical polarization rotator 432, a fourth optical polarization rotator 433 and a fifth optical polarization rotator 434.

The first port 410 and the fifth port 410a can receive a first optical signal 440 and a third optical signal 442 respectively, wherein both optical signals are received from transmitters for coupling into the bi-directional optical link. The second port 411 and the sixth port 411a can couple to bi-directional optical links. The second port 411 and the sixth port 411a can transmit the first optical signal 440 and the third optical signal 442 respectively. The second port 411 and the sixth port 411a can transmit the received optical signals to the bi-directional optical links to which they are coupled. The second port 411 and the sixth port 411a can also receive a second optical signal 441 and a fourth optical signal 443 from the bi-directional optical links to which they are coupled. The first polarizing beam splitter 420 can be optically coupled to the second port 411 and the sixth port 411a. The first polarizing beam splitter 420 can be configured to receive the second optical signal 441 and the fourth optical signal 443. The first polarizing beam splitter 420 can also be configured to split the second optical signal 441 into a first optical signal component 441a and a second optical signal component 441b. The first polarizing beam splitter 420 can further be configured to split the fourth optical signal 443 into a third optical signal component 443a and a fourth optical signal component 443b.

The first polarizing beam splitter 420 can be further configured to direct the first optical signal component 441a and the third optical signal component 443a towards the first reflective surface 421, wherein the first reflective surface 421 is configured to further direct the first optical signal component 441a and the third optical signal component 443a to pass through a first optical polarization rotator 430 and a second optical polarization rotator 431. In this example, the first optical polarization rotator 431 is a half-wave plate and the second optical polarization rotator 431 is a Faraday rotator. The third port 412 and the seventh port 412a can be configured to transmit the first optical signal component 441a and the third optical signal component 443a respectively after they pass through the second optical polarization rotator 431. The third port 412 and the seventh port 412a can also be coupled to a first receiver port and a second receiver port respectively. The third port 412 can be configured to transmit the first optical signal component 441a into the first receiver port. The seventh port 412a can be configured to transmit the third optical signal 443a into the second receiver port. The first optical signal component 441a and the third optical signal component 443a, when transmitted from the third port 412 and the seventh port 412a respectively, can have a first polarization state.

The first polarizing beam splitter 420 can also further be configured to direct the second optical signal component 441b and the fourth optical signal component 443b through the third optical polarization rotator 432 and the fourth optical polarization rotator 433. In this example, the third optical polarization rotator 432 is a half-wave plate and the fourth optical polarization rotator 433 is a Faraday rotator. The second polarizing beam splitter 422 can be configured to receive the second optical signal component 241b and the fourth optical signal component 443b after they pass through the fourth optical polarization rotator 433. The second polarizing beam splitter 422 can be configured to direct the second optical signal component 441b and the fourth optical signal component 443b towards the second reflective surface 423. The second reflective surface 423 can be configured to direct the second optical signal component 441b and the fourth optical signal component 443b towards the fifth optical polarization rotator 434. The fourth port 413 can be configured to transmit the second optical signal component 441b after it passes through the fifth optical polarization rotator 434. The fourth port 413 can also be coupled to a third receiver port and be configured to transmit the second optical signal component 441b into the third receiver port. The eighth port 413a can configured to transmit the fourth optical signal component 443b after it passes through the fifth optical polarization rotator 434. The eighth port 413a can also be coupled to a fourth receiver port and be configured to transmit the received fourth optical signal component 443b into the fourth receiver port. The second optical signal component 441b and the fourth optical signal component 443b, when transmitted from the fourth port 413 and the eighth port 413a respectively, can have a second polarization state substantially aligned with the first polarization state.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. An integrated optical circulator enabling polarization diversity, the integrated optical circulator comprising:
    a first port configured to receive a first optical signal;
    a second port configured to transmit the first optical signal received at the first port and also configured to receive a second optical signal;
    a first polarization beam splitter configured to:
        receive the second optical signal;
        split the second optical signal into a first optical signal component and a second optical signal component;
        direct the first optical signal component towards a first reflective surface,
        and direct the second optical signal component through a first optical polarization rotator;
a second polarization beam splitter configured to receive the second optical signal component after the second optical signal component passes through the first optical polarization rotator, wherein the second polarization beam splitter does not receive the first optical signal component; and
a third port configured to transmit the first optical signal component of the second optical signal after it passes through a second optical polarization rotator, a fourth port transmitting the second optical signal component at a second polarization state substantially aligned with a first polarization state.

2. The integrated optical circulator of claim 1, further comprising the fourth port configured to transmit the second optical signal component after it passes through the first optical polarization rotator, the third port transmitting the first optical signal component at the first polarization state.

3. The integrated optical circulator of claim 1, wherein the first reflective surface is configured to further direct the first optical signal component to pass through the first optical polarization rotator.

4. The integrated optical circulator of claim 1, wherein the second polarization beam splitter is further configured to direct the second optical signal component towards a second reflective surface, the second reflective surface directing the second optical signal component towards a third optical polarization rotator.

5. The integrated optical circulator of claim 1 wherein the first optical polarization rotator is a half-wave plate.

6. The integrated optical circulator of claim 1, wherein the first optical polarization rotator is a continuous optical polarization rotator.

7. The integrated optical circulator of claim 1, wherein:
a fifth port is configured to receive a third optical signal;
a sixth port is configured to transmit the third optical signal received at the fifth port and also configured to receive a fourth optical signal;
the first polarization beam splitter is further configured to:
receive the fourth optical signal;
split the fourth optical signal into a third optical signal component and a fourth optical signal component;
direct the third optical signal component towards the first reflective surface,
wherein the first reflective surface is configured to further direct the third optical signal component to pass through the first optical polarization rotator; and
direct the fourth optical signal component through the first optical polarization rotator;
the second polarization beam splitter is configured to receive the fourth optical signal component after the fourth optical signal component passes through the first optical polarization rotator, and direct the fourth optical signal component towards a second reflective surface, the second reflective surface directing the fourth optical signal component towards the third optical polarization rotator;
a seventh port configured to transmit the third optical signal component after it passes through the first optical polarization rotator, the seventh port transmitting the third optical signal component at a first polarization state; and
an eighth port configured to transmit the fourth optical signal component after it passes through the third optical polarization rotator, the eighth port transmitting the fourth optical signal component at a second polarization state.

8. The integrated optical circulator of claim 1, wherein at least one additional optical polarization rotator is optically coupled to either the first optical polarization rotator, the second optical polarization rotator, or both.

9. The integrated optical circulator of claim 8, wherein the at least one additional optical polarization rotator is a Faraday rotator.

10. The integrated optical circulator of claim 1, further comprising a third reflective surface, wherein the third reflective surface is a polarizing beam splitter.

11. The integrated optical circulator of claim 1, further comprising a fourth reflective surface, wherein the forth reflective surface is a polarizing beam splitter.

12. The integrated optical circulator of claim 1, wherein the first polarization state and second polarization state are p-polarizations.

13. The integrated optical circulator of claim 1, wherein the first transmitted signal is p-polarized.

14. The integrated optical circulator of claim 1, wherein the first polarizing beam splitter splits the second optical signal into the first optical signal component and the second optical signal component carrying orthogonal polarizations.

15. An integrated optical circulator enabling polarization diversity, the integrated optical circulator comprising:
a first port configured to receive a first optical signal;
a third port configured to transmit the first optical signal received at the first port and also configured to receive a second optical signal;
a first polarization beam splitter configured to:
receive the second optical signal;
split the second optical signal into a first optical signal component and a second optical signal component;
direct the first optical signal component towards a first reflective surface,
and
direct the second optical signal component through a first optical polarization rotator; and
a second polarization beam splitter configured to receive the second optical signal component after the second optical signal component passes through the first optical polarization rotator,
wherein the second polarization beam splitter does not receive the first optical signal component, and
wherein the second polarization beam splitter is further configured to direct the second optical signal component towards a second reflective surface, the second reflective surface directing the second optical signal component towards a second optical polarization rotator.

16. The integrated optical circulator of claim 15, further comprising a third port configured to transmit the first optical signal component after it passes through the first optical polarization rotator, the third port transmitting the first optical signal component at a first polarization state.

17. The integrated optical circulator of claim 15, further comprising a fourth port configured to transmit the second optical signal component of the second optical signal after it passes through the second optical polarization rotator, the fourth port transmitting the second optical signal component at a second polarization state substantially aligned with a first polarization state.

18. The integrated optical circulator of claim 17, wherein the first polarization state and second polarization state are p-polarizations.

19. The integrated optical circulator of claim 15, wherein the first reflective surface is configured to further direct the first optical signal component to pass through the first optical polarization rotator.

20. The integrated optical circulator of claim 15 wherein the first optical polarization rotator is a half-wave plate.

21. The integrated optical circulator of claim 15, wherein the first optical polarization rotator is a continuous optical polarization rotator.

22. The integrated optical circulator of claim 15, wherein:
a fifth port is configured to receive a third optical signal;
a sixth port is configured to transmit the third optical signal received at the fifth port and also configured to receive a fourth optical signal;
the first polarization beam splitter is further configured to:
receive the fourth optical signal;
split the fourth optical signal into a third optical signal component and a fourth optical signal component;
direct the third optical signal component towards the first reflective surface,
wherein the first reflective surface is configured to further direct the third optical signal component to pass through the first optical polarization rotator; and
direct the fourth optical signal component through the first optical polarization rotator;
the second polarization beam splitter is configured to receive the fourth optical signal component after the fourth optical signal component passes through the first optical polarization rotator, and direct the fourth optical signal component towards a second reflective surface, the second reflective surface directing the fourth optical signal component towards the second optical polarization rotator;
a seventh port configured to transmit the third optical signal component after it passes through the first optical polarization rotator, the seventh port transmitting the third optical signal component at a first polarization state; and
an eighth port configured to transmit the fourth optical signal component after it passes through the second optical polarization rotator, the eighth port transmitting the fourth optical signal component at a second polarization state.

23. The integrated optical circulator of claim 15, wherein at least one additional optical polarization rotator is optically coupled to either the first optical polarization rotator, the second optical polarization rotator, or both.

24. The integrated optical circulator of claim 23, wherein the at least one additional optical polarization rotator is a Faraday rotator.

25. The integrated optical circulator of claim 15, further comprising a third reflective surface, wherein the third reflective surface is a polarizing beam splitter.

26. The integrated optical circulator of claim 15, further comprising a fourth reflective surface, wherein the forth reflective surface is a polarizing beam splitter.

27. The integrated optical circulator of claim 15, wherein the first transmitted signal is p-polarized.

28. The integrated optical circulator of claim 15, wherein the first polarizing beam splitter splits the second optical signal into the first optical signal component and the second optical signal component carrying orthogonal polarizations.

29. An integrated optical circulator enabling polarization diversity, the integrated optical circulator comprising:
a first port configured to receive a first optical signal;
a second port configured to transmit the first optical signal received at the first port and also configured to receive a second optical signal;
a first polarization beam splitter configured to:
receive the second optical signal;
split the second optical signal into a first optical signal component and a second optical signal component;
direct the first optical signal component towards a first reflective surface,
and
direct the second optical signal component through a first optical polarization rotator;
a second polarization beam splitter configured to receive the second optical signal component after the second optical signal component passes through the first optical polarization rotator, wherein the second polarization beam splitter does not receive the first optical signal component;
a third port is configured to receive a third optical signal;
a forth port is configured to transmit the third optical signal received at the third port and also configured to receive a fourth optical signal;
the first polarization beam splitter is further configured to:
receive the fourth optical signal;
split the fourth optical signal into a third optical signal component and a fourth optical signal component;
direct the third optical signal component towards the first reflective surface
wherein the first reflective surface is configured to further direct the third optical signal component to pass through the first optical polarization rotator; and
direct the fourth optical signal component through the first optical polarization rotator;
the second polarization beam splitter is configured to receive the fourth optical signal component after the fourth optical signal component passes through the first optical polarization rotator, and direct the fourth optical signal component towards a second reflective surface, the second reflective surface directing the fourth optical signal component towards a second optical polarization rotator;
a fifth port configured to transmit the third optical signal component after it passes through the first optical polarization rotator, the fifth port transmitting the third optical signal component at a first polarization state; and
an sixth port configured to transmit the fourth optical signal component after it passes through the second optical polarization rotator, the eighth port transmitting the fourth optical signal component at a second polarization state.

30. The integrated optical circulator of claim 29, further comprising a seventh port configured to transmit the first optical signal component after it passes through the first optical polarization rotator, the seventh port transmitting the first optical signal component at a first polarization state.

31. The integrated optical circulator of claim 29, further comprising a eighth port configured to transmit the second optical signal component of the second optical signal after it passes through a second optical polarization rotator, the eighth port transmitting the second optical signal component at a second polarization state substantially aligned with the first polarization state.

32. The integrated optical circulator of claim 31, wherein the first polarization state and second polarization state are p-polarizations.

33. The integrated optical circulator of claim 29, wherein the first reflective surface is configured to further direct the first optical signal component to pass through the first optical polarization rotator.

34. The integrated optical circulator of claim 29, wherein the second polarization beam splitter is further configured to direct the second optical signal component towards the second reflective surface, the second reflective surface directing the second optical signal component towards a second optical polarization rotator.

35. The integrated optical circulator of claim 29, wherein at least one optical polarization rotator is a half-wave plate.

36. The integrated optical circulator of claim 29, wherein the first optical polarization rotator is a continuous optical polarization rotator.

37. The integrated optical circulator of claim 29, wherein at least one additional optical polarization rotator is optically coupled to either the first optical polarization rotator, the second optical polarization rotator, or both.

38. The integrated optical circulator of claim 37, wherein the at least one additional optical polarization rotator is a Faraday rotator.

39. The integrated optical circulator of claim 29, further comprising a third reflective surface, wherein the third reflective surface is a polarizing beam splitter.

40. The integrated optical circulator of claim 29, further comprising a fourth reflective surface, wherein the forth reflective surface is a polarizing beam splitter.

41. The integrated optical circulator of claim 29, wherein the first transmitted signal is p-polarized.

42. The integrated optical circulator of claim 29, wherein the first polarizing beam splitter splits the second optical signal into the first optical signal component and the second optical signal component carrying orthogonal polarizations.

* * * * *